P. HUTSON.
MEANS FOR ENABLING LIQUIDS TO BE DRAWN OFF FROM CLOSED CONTAINERS.
APPLICATION FILED JULY 18, 1912.
1,182,375. Patented May 9, 1916.
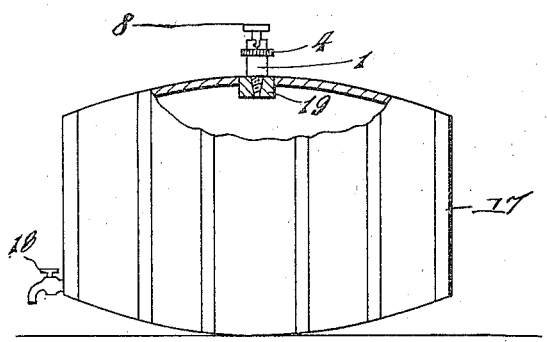
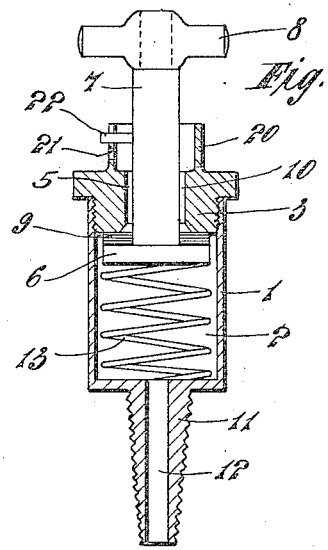
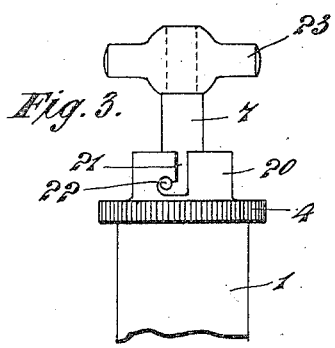
Witnesses.
Alfred R. Anderson
F. H. Logan
Inventor.
Peter Hutson.
By W. H. Berrigan
Attorney

UNITED STATES PATENT OFFICE.

PETER HUTSON, OF FRANKTON JUNCTION, NEW ZEALAND.

MEANS FOR ENABLING LIQUIDS TO BE DRAWN OFF FROM CLOSED CONTAINERS.

1,182,375. Specification of Letters Patent. Patented May 9, 1916.

Application filed July 18, 1912. Serial No. 710,272.

*To all whom it may concern:*

Be it known that I, PETER HUTSON, subject of the King of Great Britain and Ireland, residing at Frankton Junction, in the Dominion of New Zealand, have invented a new and useful Improvement in Means for Enabling Liquids to be Drawn Off from Closed Containers; and I do hereby declare the following to be a full, clear, and exact description of the same.

This invention relates to means for allowing liquids to be drawn off from closed containers, and more especially such liquids as are usually charged with a solution of carbon dioxid or any similar gas.

The object of the invention is to provide a means whereby liquids and more especially carbonated or the like liquids may be allowed or enabled to be drawn off from a closed container. According hereto a device which allows of the admission of air is employed. The device may be made a fixture in the plug or stopper of a container, or it may be a separate integer adapted to be applied to any container. The essential features of such device include a hollow cylinder, a valve within the cylinder and a spring device which normally tends to keep such valve closed. The valve is supplied with a device for at will holding the valve open and with an extension for operating purposes.

In the following description except where the context otherwise requires, the invention will be described with reference to containers for aerated liquids, but I do not limit the invention to such application.

Although the above are the essential features of my invention, it includes also various modifications in make or construction which will be more fully set out in their proper place in the specification and delimitated in the claims.

The invention is fully illustrated in the accompanying sheet of drawings forming a part of this specification and wherein similar numerals of reference indicate similar parts throughout the different views.

Figure 1, is a view of a barrel or the like having the invention applied to the bung or to any other suitable part. Fig. 2, is a sectional view through the device in a form suitable for barrels, or the like. Fig. 3, is a view of part of the device showing a detail of Fig. 2.

Referring now to the drawings the device consists of a hollow cylinder 1 having a chamber 2. A valve seating 3 screws into the top of the cylinder 1, and has a milled edge 4 to facilitate turning. The seating 3 has a passage 5 through its center. A valve 6 with a stem 7 guided through the passage 5, is provided with a handle 8. A washer of rubber 9 or any other suitable material is employed between the valve and the seat for making the valve air tight. A clearance 10 is formed by the valve stem 7 being made of a smaller diameter than the passage 5. The bottom portion 11 of the cylinder 1 is of reduced diameter and externally threaded. Through such lower and reduced portion, communication is made to the interior of the chamber by means of a passage 12 therethrough. A spring 13 in compression between the lower portion 11 and the valve 6 normally retains the valve upon its seat. The reduced end 11 is of conical form and externally threaded for the purpose of screwing into the wooden or the like wall of a container or into a bung 19 as shown in Fig. 1. Extending up from the valve seating in a cylindrical wall 20 having a vertical slot 21 so constructed as to form a bayonet joint with a pin 22 projecting from the valve stem 7. The object of the bayonet joint is to retain the valve open when a great quantity of liquid has to be drawn off from the barrel. By turning the handle 23 back slightly the spring 13 will immediately close the valve.

The operation of the device is as follows:—Aerated or the like gaseous liquid is contained in the container 17 and when on turning the tap 18 the operator finds that the pressure of the superincumbent air or gas above the liquid will not allow the liquid to flow freely through the tap, he then depresses the head 8 thereby opening the air admission valve 6. Air then passes through the clearance 5 past the valve 6 and thence to the chamber 2 and through the passage 12 and into the container 17. With the admission of such air into the container the superincumbent pressure will be increased, and the liquid will freely flow through the open tap.

The device may be made of any material such as gun-metal, aluminium or other metal which is not corroded or acted upon chemically by the contained liquid or by the gases or vapors given off therefrom.

What I desire to secure by Letters Patent of the United States is:—

1. In a vent device, the combination of a cylindrical chamber; a plug in the upper end thereof and provided with a central opening and an up-standing wall surrounding the same and having an angular slot therein; a valve stem loosely received by said opening; a piston-like valve on the lower end of the stem and loosely received in the chamber; a washer on the upper face of said valve; a pin projecting from said stem through said slot; and a spring for yieldably pressing the valve against said plug, said pin and slot coöperating to hold the valve in open position against the action of said spring.

2. In a vent device, the combination of a hollow cylindrical chamber having a lower reduced end having a passage therethrough; a valve plug in the upper end of the chamber and provided with a central opening and an up-standing cylindrical wall surrounding the opening and provided with an L-shaped bayonet slot having an open upper end; a valve stem passing loosely through said opening; a piston-like valve on the lower end of the stem and loosely received in the chamber; a washer on said valve and surrounding the stem; a radial pin projecting from said stem and engaging in said slot; and a spring interposed between the lower part of the chamber and the valve, said pin and slot coöperating to hold the valve in open position against the action of said spring.

3. In a vent device, the combination of a hollow cylindrical chamber having an internally threaded upper end and provided at its lower end with an externally threaded reduced portion integral therewith; a valve plug screwed into said upper end and provided with a central opening and an up-standing cylindrical wall surrounding the opening and having therein an L-shaped bayonet slot open at its upper end; a T-shaped valve stem passing loosely through said opening; a piston-like valve on the lower end of the stem and loosely received in said chamber; a rubber washer on said valve and surrounding the stem; a radial pin projecting from said stem and engaging in said slot, and a spiral spring in the chamber between the lower part thereof and the valve, said pin and slot coöperating to hold the valve in open position against the action of said spring.

4. In a device for enabling liquids to be drawn off from closed containers, the combination of a hollow cylinder, a valve seating screwed into said cylinder, a passage through said seating, a valve upon the under side of said valve seating, a valve stem to said valve passing through said passage, said valve stem being of a smaller diameter than the said passage to allow air to pass through said passage, a coil spring within said cylinder in compression between the said valve and the bottom of the said cylinder, a cylindrical wall extending up from the top of the valve seating, a vertical slot in said wall having a recess at its bottom end, a pin projecting from said valve stem adapted to slide in said slot and to engage in said recess to hold the valve in open position, a handle to said valve stem, and means for securing the cylinder in position, substantially as described.

In witness whereof I have signed my name to this specification in the presence of two subscribing witnesses.

PETER HUTSON.

Witnesses:
EDMOND PATRICK O'DONNELL,
SYDNEY HAMLET HIGGS.